(12) United States Patent
Hall et al.

(10) Patent No.: US 10,894,467 B2
(45) Date of Patent: Jan. 19, 2021

(54) VEHICLE WITH REMOVABLE COVER

(71) Applicants: David R. Hall, Provo, UT (US);
Stephen R. Hall, Draper, UT (US);
Christopher Johson, Provo, UT (US);
Jason Simpson, Provo, UT (US);
Jedediah Knight, Provo, UT (US)

(72) Inventors: David R. Hall, Provo, UT (US);
Stephen R. Hall, Draper, UT (US);
Christopher Johson, Provo, UT (US);
Jason Simpson, Provo, UT (US);
Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/398,015

(22) Filed: Jan. 4, 2017

(65) Prior Publication Data

US 2018/0186222 A1    Jul. 5, 2018

(51) Int. Cl.
*B60J 7/16* (2006.01)
*B60J 1/02* (2006.01)
*B60J 7/19* (2006.01)
*B60J 7/11* (2006.01)

(52) U.S. Cl.
CPC .............. *B60J 7/194* (2013.01); *B60J 7/11* (2013.01); *B60J 1/02* (2013.01); *B60J 7/1628* (2013.01)

(58) Field of Classification Search
CPC ... B60J 7/1628; B60J 7/194; B60J 1/02; B60J 7/11

USPC ................... 296/102, 210, 216.01, 218, 224
See application file for complete search history.

(56) References Cited

U.S. PATENT DOCUMENTS

| | | | | |
|---|---|---|---|---|
| 6,283,531 | B1 * | 9/2001 | Tanigawa | B60J 7/106 296/103 |
| 6,921,077 | B1 * | 7/2005 | Pupo | B60J 7/106 296/102 |
| 8,292,355 | B2 * | 10/2012 | Miller | B60J 7/1621 296/190.1 |
| 2015/0224860 | A1 * | 8/2015 | Bowles | B60R 21/13 296/218 |

* cited by examiner

*Primary Examiner* — Joseph D. Pape
*Assistant Examiner* — Dana D Ivey

(57) ABSTRACT

A vehicle is described herein that includes a body structure such as a windshield and/or a windshield frame, a compartment such as a passenger compartment, one or more body panels around the compartment, and an at least partially floating cover, such as a roof, disposed over the compartment. The floating cover includes one or more body structure mounts and an overhang extending from the body structure over the compartment to an aft portion of the compartment. Other similar embodiments include features such as support structures, support structure mounts that mount the floating cover to the support structures, and various aerodynamic features incorporated into the floating cover. For example, some embodiments include roll bars and roll bar mounts, aerodynamic arcs, and aerodynamically continuous surfaces.

20 Claims, 13 Drawing Sheets

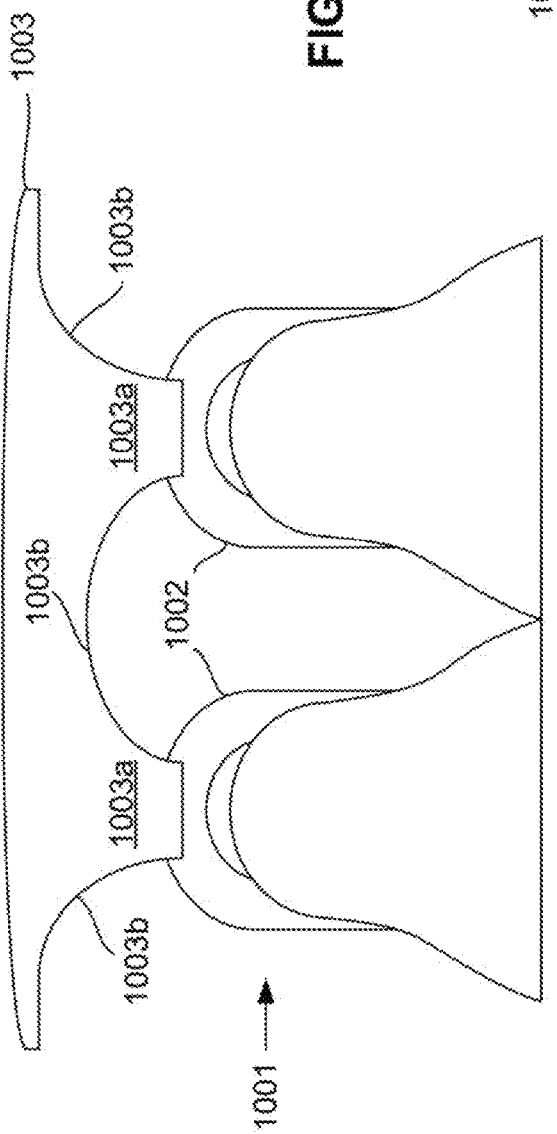
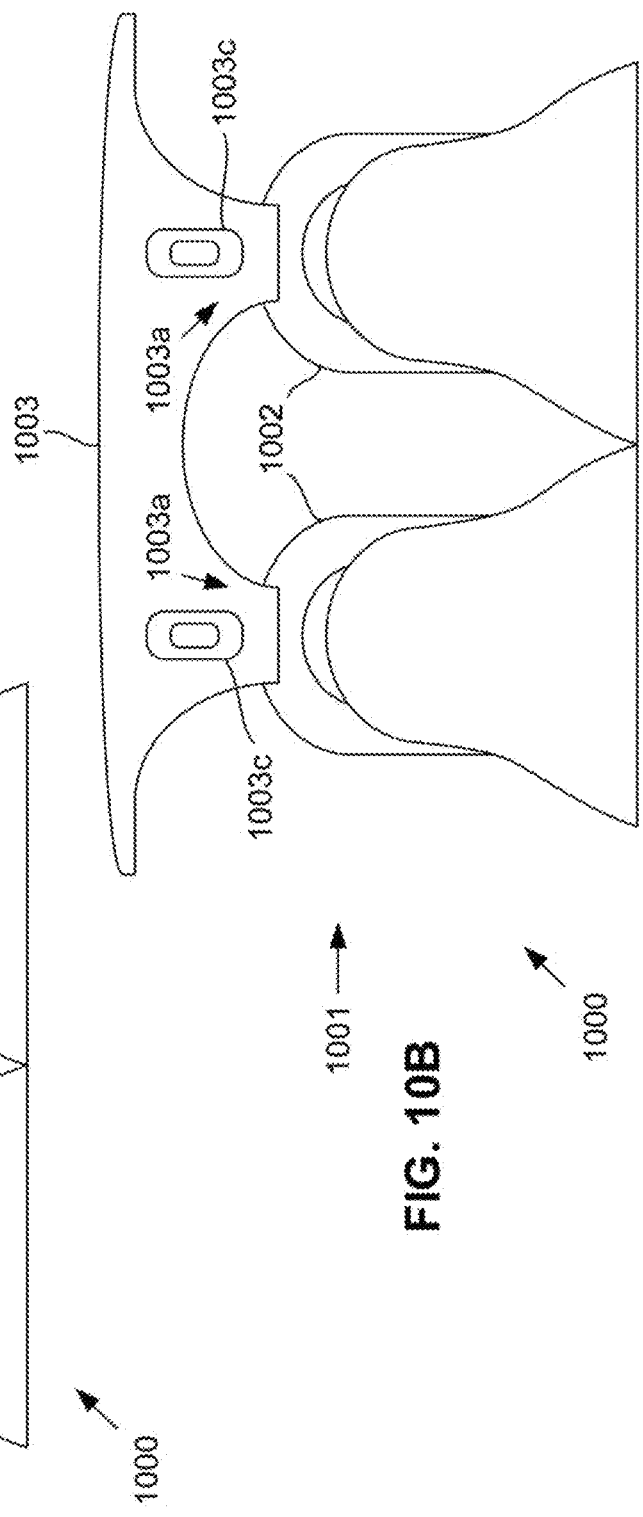
FIG. 10A
FIG. 10B

VEHICLE WITH REMOVABLE COVER

TECHNICAL FIELD

This invention relates generally to the field of vehicles and more specifically to vehicle compartments with removable covers.

BACKGROUND

Convertible vehicles have been, for decades, the status symbol of freedom and flexibility for car owners. Offering many benefits over conventional, fixed-roof vehicles, convertibles embody, for many consumers, the thrill of driving. However, many convertibles only offer a binary choice: off or on. In other words, the passenger compartment is either enclosed or unenclosed. This can be a problem when a driver wants the feel of a convertible but still requires some cover, such as from the sun. Some off-road and sport utility vehicles include a solution that provides shade while still leaving the passenger compartment open to airflow. However, many of these solutions are implemented on vehicles that have bulky roll cages surrounding the passenger compartment. Additionally, few, if any, solutions have been presented for roadsters. Thus, there is room for improvement to convertible vehicles.

SUMMARY OF THE INVENTION

Various embodiments of a vehicle are described herein that incorporate features addressing at least some of the issues described above. Embodiments of the vehicles include an at least partially floating cover that overhangs a compartment of the vehicle. This addresses the problems described above in several ways. For example, the roof provides shade and allows for significant airflow through the compartment without requiring a bulky roll cage.

In one embodiment of the vehicle described herein, the vehicle includes a body structure such as a windshield and/or a windshield frame, a compartment such as a passenger compartment, one or more body panels around the compartment, and a floating cover, such as a roof, disposed over the compartment. The floating cover includes one or more body structure mounts and an overhang extending from the body structure over the compartment to an aft portion of the compartment. Other similar embodiments include features such as support structures, support structure mounts that mount the floating cover to the support structures, and various aerodynamic features incorporated into the floating cover. For example, some embodiments include roll bars and roll bar mounts, aerodynamic arcs, and aerodynamically continuous surfaces.

BRIEF DESCRIPTION OF THE DRAWINGS

A more particular description of the invention briefly described above is made below by reference to specific embodiments. Several embodiments are depicted in drawings included with this application, in which:

FIGS. 10A-B depict partial section views of a vehicle including a floating, removable cover supported on support structures by support structure mounts.

DETAILED DESCRIPTION

Figure 1A:
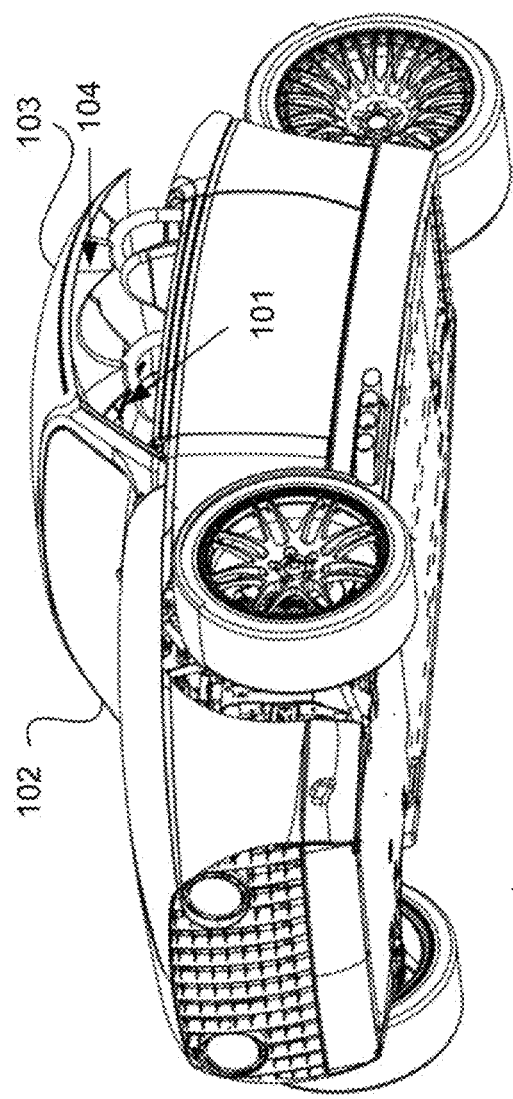
FIGS. 1A-B depict two views of a vehicle on which a floating, removable cover may be used.

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed. Because an exhaustive list of example embodiments is impractical, only a few examples are provided. However, in general, the embodiments described are intended to incorporate any other embodiment that performs a similar function to the embodiments provided, acts in a similar way to the embodiments provided, and/or yields a similar result as the embodiments provided. Because the embodiments described are only exemplary, the appended claims are, naturally, broader than the described embodiments, and encompass embodiments not expressly described, but that still fall within the scope of the claims.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Definitions of various words and phrases used throughout this specification are provided below. The definitions are not meant to supplant the meaning of these words as commonly used in the technical field, or to replace the dictionary definitions, but rather are provided to supplement such meanings and definitions. Thus, the definitions provided below should not be construed to limit the meaning of the words to anything inconsistent with the dictionary definitions and the meanings as commonly understood in the technical field. Additionally, many of the definitions provided below include definitions by example. As used herein:

Affix (v) refers to fastening or attaching one object permanently or impermanently to another object;

And/or refers to a list of things as alternatives AND in conjunction;

Complementary refers to two or more objects, each of which fills a space or void left by the shape of the other object. For example, a cylindrical rod and a c-channel having a similar radius, even if not mated, are considered to be complementary;

Convertible, when used to refer to a vehicle or vehicle component, is used to describe a vehicle that incorporates a removable compartment cover;

Corresponding refers to two or more objects that are associated in performing a specific function;

Explementary refers to two or more surfaces and/or shapes that, together, form a continuous path, e.g. a circumference;

Extend refers to placing or being positioned along a length;

Floating refers to an object that wholly or partially appears to hover, extending as an overhang from a support structure;

Form (v) refers to creating an object or a portion of an object out of one or more other objects;

Mate (v) refers to the fitting together of two or more objects, especially objects having complementary surfaces and/or shapes;

May is used in referring to elements that are used in at least one, but not necessarily all, embodiments;

Mount (n) refers to an intermediary object and/or a surface that provides structural support to another object;

Mount (v) refers to providing structural support to an object;

Monolithic refers to an object formed of a single material, the object being free of joinder between two separate objects, although joinder of separate portions of the same object may be found;

Overhang (n) refers to an object and/or portion of an object that extends over a space or other object from a mount and that has at least one free-hanging end, supported only by extension from the mount;

Overhang (v) refers to suspending an object and/or portion of an object over a space or other object from a mount, leaving at least one end free-hanging, supported only by extension from the mount;

Removable describes something that can be taken away without damaging the thing from which it is taken, and that can similarly be replaced without substantially altering the structure of the thing to which it is added;

Rigid refers to high resistance of an object to flexural forces relative to the object's dimensions, such that deflection of the object is limited to less than or equal to 10% of the object's length, width or thickness;

Similar refers to one or more things that one of skill in the art would consider reasonable alternatives to each other;

Void refers to open-air space between two or more structures and/or structural components; and Wrap (v) refers to extending at least partially around an object, covering a side of the object.

Figure 1B:
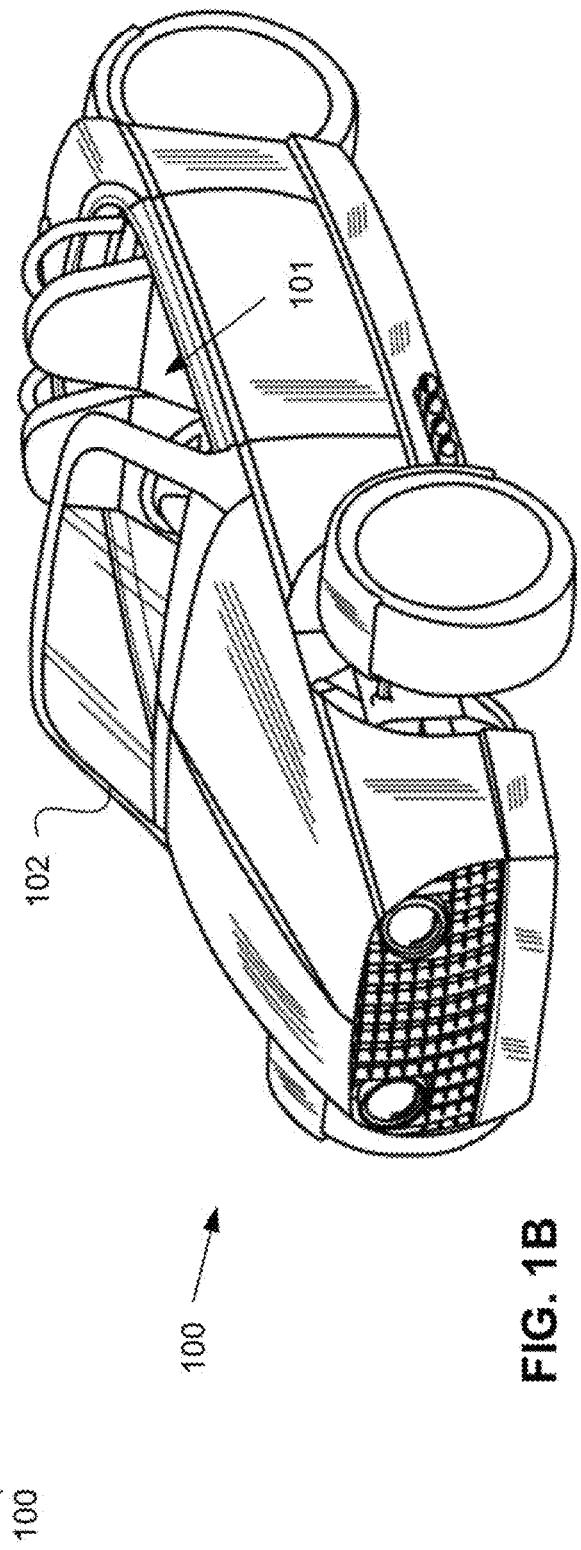

FIGS. 1A-B depict two views of a vehicle on which a removable and at least partially floating cover may be used. Vehicle 100 includes compartment 101, body structure 102, and floating, removable cover 103. Various embodiments, such as those depicted, may also include support structures 104. As shown in FIG. 1B, in various embodiments, the cover may be removed, and the vehicle may be operated without the cover.

Although the vehicle shown is a three-wheeled roadster, the floating, removable cover may be implemented on any of a variety of vehicles. As used herein, "vehicle" refers, generally, to any of a variety of inanimate passenger or cargo carriers, including landcraft, watercraft, aircraft, and combinations thereof. Examples include automobiles, all-terrain vehicles, amphibious vehicles, buses, trucks, cars, rickshaws, bicycles, motorcycles, cable cars, sleds, golf carts, drones, handcars, hovercraft, land yachts, locomotives, maglevs, minibuses, minivans, monorails, monowheels, mopeds, omni directional vehicles, quadracycles, rocket sleds, rovers, sea tractors, ground effect vehicles, boats, ships, catamarans, canoes, hydrofoils, jet skis, kayaks, ferries, airplanes, helicopters, autogyros, balloons, gliders, ornithopters, pedalos, powered parachutes, and rockets, among others.

The vehicle may include any of a variety of mechanisms for travelling across and/or through surfaces, such as wheels, skis, skids, hulls, and airfoils. Similarly, the vehicle may include any of a variety of mechanisms for accessing the vehicle, such as doors, windows, hatches, and permanent openings. In various embodiments, the vehicle may include a frame on which various vehicle components are mounted. The vehicle may also, in some embodiments, include components such as body panels, an engine or motor, a transmission, an electrical system, one or more batteries, a heating and/or cooling system, navigational systems, and a fuel system, among others. Various vehicle components may be comprised of any of a variety of materials and material combinations, such as metal, plastic, rubber, leather, glass and composites.

Various embodiments of the vehicle, such as those depicted, include the compartment. The compartment may include any of a variety of spaces within and/or partially within the vehicle, such as a passenger compartment, a cargo compartment, and/or an engine compartment. The compartment may be formed by any of a variety of vehicle structures, including a vehicle frame, one or more vehicle body panels, a fuselage, a hull, and/or a deckhouse, among others. Disposed within the compartment may be various vehicle components, including vehicle operational controls, passenger accommodations, one or more engines and/or motors, fuel system components, and/or various cargo support structures, among others. The compartment may be accessed in a variety of ways, such as by a door, a hatch, and/or a removable panel, among others.

The compartment may be at least partially enclosed by one or more vehicle structural components, including a vehicle frame and/or body panels. In various embodiments, the frame may include a unibody frame and/or a body-on frame construction. Additionally, in various embodiments, the body panels may include aluminum panels, carbon fiber panels, fiberglass panels, steel panels, and/or fiber-reinforced composite panels. The body panels may be planar and/or convex or concave, and may be oriented vertically or horizontally with respect to the typical drive orientation of the vehicle.

The body structure includes, generally, any of a variety of vehicle body components, such as windshields, windows, body panels, walls, cowlings, and/or gunwales, among others. For example, in the depicted embodiment, the body structure is a windshield. The windshield may be made of a variety of materials, including glass and/or plastic, among others. The body structure may be transparent, partially transparent, and/or opaque. Additionally or alternatively, the body structure may incorporate various display and/or visual features, such as a heads-up digital display, an LED display, an OLED display, a plasma screen display, and/or an LCD display, among others. Other visual features may include various gauges and/or dials, among others. The body structure may incorporate various air flow features, such as vents and/or fans, among others. In various embodiments, the body structure is monolithic; in other embodiments, the body structure may incorporate a frame and/or one or more panels. For example, in some embodiments, the body structure includes a pane of shatter-resistant glass set within a frame encircling the glass. In other embodiments, the body structure includes an aluminum frame incorporating at least one aluminum outer panel and one or more plastic inner panels. In yet other embodiments, the body structure includes a double-walled fiberglass gunwale.

The floating, removable cover extends from the body structure and floats over the compartment. For example, in the depicted embodiment, the cover is a floating convertible hard top roof panel. In general, the cover may be formed by any of a variety of materials in any of a variety of ways. Such materials include various metals, such as aluminum and/or steel, various plastics, such as any of a variety of thermoformed plastics, including compounds such as acrylic, ABS, polylactic acid, polybenzimidazole, polycarbonate, polyether sulfone, polyetherether ketone, polyetherimide, polyethylene, polyphenylene oxide, polyphenylene sulfide, polypropylene, polystyrene, PVC, and/or Teflon, various glass compounds including shatter-resistant glass, and/or various fibrous composites, such as carbon fiber and/or fiberglass, among others.

The cover may be formed as a monolithic panel, as a double-walled panel, and/or as a panel-on-frame structure. For example, in one embodiment, a method of forming the cover includes laser-cutting and/or welding an aluminum frame to have openings, applying a polymer adhesive/sealant to the edges of the openings, and laying one or more glass panes in the opening. Another method of forming the cover includes thermoforming, separately, two or more thermoplastics having different setting temperatures, the separate forms including junctions, setting the forms, and joining the forms. Yet another embodiment of forming the cover includes creating one or more molds and pressing a fibrous material into the molds. The fibrous material may include a thermoset resin, and/or a thermoset resin may be applied to the material once in the mold. The material and resin are then pressure-cooked.

The support structures may provide, in various embodiments, structural support for the floating, removable cover. In some embodiments, the support structures are multipurpose, providing support for the cover when the cover is mounted to the vehicle, and providing structural support and/or protection when the vehicle is inverted. For example, in the depicted embodiment, the support structures are roll bars. The roll bars may be curved, as in the depicted embodiment, or the roll bars may form any of a variety of shapes, such as a rectangle, a triangle, and any of a variety of polyhedrons. Additionally, in the depicted embodiments, the roll bars have circular cross sections. However, the roll bars may have, in other embodiments, any of a variety of polygonal cross-sections, such as rectangular, triangular, pentagonal, hexagonal, heptagonal, octagonal, nonagonal, decagonal, and so forth. Also as depicted, the vehicle includes two roll bars, one each behind passenger seats. However, the vehicle may include one roll bar extending behind both seats, or in embodiments with only one seat, the vehicle may include one or more roll bars corresponding to that seat.

Although in the depicted embodiment the support structures are roll bars, other embodiments of the vehicle may include other types of support structures. For example, in one embodiment, the support structures are headrests for passenger seats. In some embodiments, the support structures may be one or more vehicle frame members. In some embodiments, the support structures may be a portion of a gunwale, one or more pylons or beams, or a portion of a fuselage.

The support structures may be comprised of any of a variety of materials, including a variety of metals, plastics, composites, and/or organics. Such materials may include iron, steel, aluminum, copper, platinum, titanium, nickel, palladium, rhodium, ABS, PVC, polypropylene, polycarbonate, silicone, melamine, fiber-reinforced composites, fiberglass, carbon fiber, and/or wood.

In general, vehicle embodiments are described herein that include a removable and at least partially floating cover disposed over a vehicle compartment. The vehicle may include a body structure, a compartment, and/or one or more body panels around the compartment. The removable cover may include one or more body structure mounts and an overhang that extends from the body structure over and across the compartment. For example, in some embodiments, the vehicle includes a windshield, a passenger compartment, one or more body panels around the passenger compartment, and a floating, removable roof disposed over the passenger compartment. The roof includes one or more windshield mounts and an overhang extending from the windshield over and across the passenger compartment. In one such embodiment, the vehicle is a three-wheeled roadster, such as that depicted in FIGS. 1A-B, 3, 4, and 6A-8. The three-wheeled roadster includes a unibody frame, a windshield, a passenger compartment having two side-by-side passenger seats, carbon fiber body panels around the passenger compartment, including a horizontally-oriented aft body panel, and a floating, removable roof disposed over the passenger compartment. The roof includes one or more windshield mounts and an overhang extending from the windshield over and across the passenger compartment.

Various vehicle embodiments described herein may include at least one body panel disposed aft of the compartment and/or aligned substantially parallel to the cover. Examples of such embodiments are depicted in FIGS. 1A-B, 3, 4, 6A, and 7. The body panel may be disposed forward or aft of the compartment, or may be disposed left and/or right of the compartment. For example, in one embodiment, the compartment is a passenger compartment, and the body panel is disposed aft of the passenger compartment. In another embodiment, the compartment is a cargo compartment, such as the bed of a pickup truck, and the body panel is disposed to the left and the right of the cargo compartment. In another embodiment, the vehicle is a boat, the compartment is a passenger compartment, and the body panel is a portion of a deck of the boat aft of the passenger compartment.

The vehicle may also include a void disposed between the cover and the one or more body panels. Examples of such embodiments are depicted in FIGS. 1A-B, 3, 4, 6A, 7, and 9. The void may extend around and/or over the compartment, and may be continuous, or may be intermittently interrupted, such as by various structures supporting the cover. The void may extend from a first side of the body structure to a second side of the body structure and/or beneath the floating overhang. For example, in one embodiment, the vehicle is a convertible having a floating, removable hard top roof. The void extends around a passenger compartment of the convertible from the driver's side of the convertible's windshield to a passenger side of the windshield, and extends beneath the floating overhang between an aft body panel and the floating hard top.

In various embodiments, the floating, removable cover may be monolithic and/or rigid. Examples of such embodiments are depicted in FIGS. 1A, and 2A-9. For example, in some such embodiments, the body structure mounts may include one or more protruding, molded plastic clips integrally formed with the cover that extend from the cover into corresponding holes in the vehicle body structure into which the clips extend. Examples of such embodiments are depicted in FIGS. 2A-B, 3, 5A, 6B, and 8. The clips may include bifurcated, trifurcated, or otherwise lengthwise segmented ends that compress radially inwards as the clips are pressed into the holes and that snap back radially outwards as the clips pass through the holes. The clips may also include one or more radially protruding lips that catch onto a surface of the vehicle body structure and prevent the clips from retracting out of the holes. In some embodiments, the monolithic/rigid cover also includes an aft set of body structure mounts, examples of which are described further below.

In some embodiments, the floating, removable cover may have a directionally-biased center of mass. Examples of such embodiments are depicted in FIGS. 1A, 2A-B, 4, 5A-B, and 9. For example, the center of mass may be biased towards a forward portion of the cover, an aft portion of the cover, a left side of the cover and/or a right side of the cover. In some such embodiments, the cover is a floating roof, and the vehicle is a passenger car. The center of mass of the roof is biased towards the windshield, closer to the windshield than to an aft portion of the passenger compartment. In one specific embodiment, the center of mass is disposed over the windshield such that at least one of the windshield mounts is aligned with the center of mass of the floating roof. In another embodiment, at least one of the windshield mounts is aligned left-to-right with the center of mass, and the forward-aft center of mass is positioned over the passenger compartment.

Various vehicle embodiments described herein may include a floating, removable cover having a frame and a shell wrapped over the rigid frame, the shell and the frame forming the cover overhang. Examples of such embodiments are depicted in at least FIGS. 3, 6B and 8. The frame provides structural support for the shell, and the shell forms the covering. The shell may incorporate transparent and/or partially transparent portions. For example, the shell may, in various embodiments, incorporate a transparent material that is tinted to filter UV rays while still allowing some visible light to pass through the cover to the passenger compartment. The cover frame and/or the shell may be rigid, flexible, or may incorporate rigid and flexible portions. The cover frame may, in various embodiments, couple to the vehicle body structure by the body structure mounts. Alternatively or additionally, the shell may couple to the vehicle body structure by the body structure mounts. For example, in one embodiment, the vehicle is a convertible. The cover is a removable soft top roof, and includes a rigid frame. The roof frame is coupled to the windshield by windshield mounts. The roof frame is comprised of fiberglass rods, and the shell is comprised of a canvas stretched over the fiberglass rod frame. In another embodiment, the frame is comprised of laser-cut aluminum, and the shell is comprised of compression-molded carbon fiber.

Similar to that described above with regard to FIGS. 1A-B, various embodiments may include one or more support structures, such as one or more roll bars. Examples of such embodiments are depicted in FIGS. 1A, 2A-C, 4, and 5A-B. In such embodiments, the cover may include one or more support structure mounts extending beneath the floating cover and mounting the floating cover to the one or more support structures. For example, the support structures may include one or more roll bars, and the support structure mounts may include one or more roll bar mounts. The support structure mounts may be rigid in various embodiments. The support structure mounts may include one or more of a variety of coupling mechanisms that couple, secure, and/or affix the support structure mounts, and thereby the cover, to the support structures. For example, in some embodiments where the support structures include one or more roll bars, the coupling mechanism may include one or more straps wrapped at least partially around the one or more roll bars, thereby affixing the one or more rigid roll bar mounts to the one or more roll bars. One such embodiment includes one or more ratcheting mechanisms disposed within, and coupled to, the one or more roll bar mounts. The straps may be affixed at one end to the roll bar mounts, wrap around the corresponding roll bars, and be inserted into the support structure and the ratcheting mechanism. The ratcheting mechanism may include a manual and/or automated winding mechanism. For example, in one embodiment, the ratcheting mechanism includes a winding mechanism wirelessly controlled by a personal computing device, such as a smartphone.

In various embodiments, the one or more support structure mounts may include one or more surfaces mated with the one or more support structures. Examples of such embodiments are depicted in FIGS. 2A-B, 4-5B, and 10A-11E. In such embodiments, the support structure mount surface/s may include one or more shapes complementary to a corresponding surface shape of at least one of the one or more support structures. For instance, in various embodiments of the roll bar example described above, the corresponding shape of at least one of the one or more roll bars is circular, and the complementary roll bar mount surface shape includes an arc that mates with the at least one roll bar. The arc may be semi-circular. For example, in one embodiment, the arc angle is equal to or less than one hundred and eighty degrees. In another embodiment, the arc angle is greater than one hundred and eighty degrees. In some similar embodiments, the arc angle corresponds with a flexural strength of a material forming the at least one rigid roll bar mount. The relationship may be a function of a chord length formed by the arc, the diameter of the roll bar, and the flexural strength of the material forming the roll bar mount. For example, the arc angle may be proportional to the diameter of the roll bar less twice the maximum depth of deflection of the one arm of the arc, where the maximum depth of deflection is proportional to the chord length formed by the arc and the elastic modulus of the material forming the roll bar mount. Such materials may include any of a variety polymers, including rubber and plastic materials similar to those described above for other elements of the vehicle.

In some embodiments, one or more of the one or more support structure mounts include a rigid clasp. For example, some embodiments that include the strap also include a clasp that affixes the strap to the support structure mount/s. In other embodiments, the clasp is rigid, wraps around and/or through the support structure, and mates with the support structure. For example, in various roll bar embodiments, the clasp includes a hinge, a rigid arc structure, and a latch. The clasp may be employed in embodiments where the support structure mount forms an arc, and may be explementary to the support structure mount arc.

The support structures may include one or more openings, and the support structure mounts may include one or more end portions corresponding to the one or more openings and extending at least partially into the one or more openings. In some such embodiments, the end portion extends through the support structure, and a securing mechanism prevents the end portion from retracting through the support structure. For example, in one roll bar embodiment, the end portion comprises one or more pins and/or rods. The securing mechanism may include a linchpin, nut, and/or cap. The securing mechanism may also and/or alternatively be incorporated into the end portion. For example, in one embodiment, the end portion includes a rod that extends through an opening in the roll bar. One end of the opening is formed of a hardened rubber, and one end of the rod is spherical, and has a diameter larger than the diameter of the opening. The spherical portion is pressed through the rubber opening and held in place by the force that would otherwise be required to pull the larger-diameter spherical portion through the opening.

In various embodiments, the cover is mounted to the body structure in a similar way. As described above, in some embodiments the body structure is a windshield and/or windshield frame. The windshield and/or windshield frame may include one or more openings formed of, for example, a hardened rubber. The cover may include one or more rods having at least one spherical end that has a diameter larger than the corresponding opening. The spherical portion is pressed through the rubber opening and held in place by the force that would otherwise be required to pull the larger-diameter spherical portion through the opening.

The support structure mount may be affixed to the support structure in other ways, either in addition to previously described ways, or alternatively to previously described ways. For example, in some embodiments, at least one of the one or more support structure mounts is magnetically affixed to at least one of the one or more support structures. Some such embodiments are roll bar embodiments, wherein one or more of the roll bars and one or more of the roll bar mounts include one or more permanent magnets, ferromagnets, and/or electromagnets. In one embodiment, the roll bars are ferromagnetic, and the roll bar mounts include electromagnets adjacent to the surfaces that abut the roll bars. The electromagnets may be electrically coupled to the vehicle's electrical system, may be battery powered separately from the vehicle's electrical system, and/or may be solar-powered via solar panels incorporated into the cover and/or vehicle.

Various embodiments of the vehicle and cover may include various aerodynamic features. For example, the cover overhang and the support structure mounts may form an arc. Some embodiments include at least two support structure mounts, and in some such embodiments, the arc may be disposed between the at least two support structure mounts. In some embodiments, the body structure and the cover form an aerodynamically continuous surface. Aerodynamic continuity depends on the wind speed against and/or across a surface, and is generally characterized by minimal turbulence that disrupts airflow across a surface. Thus, in various embodiments, the body structure and cover form an aerodynamically continuous surface for wind speeds up to a maximum driven velocity of the vehicle (the maximum velocity at which the vehicle travels due exclusively to force attributable to the vehicle's power plant).

Figure 2A:
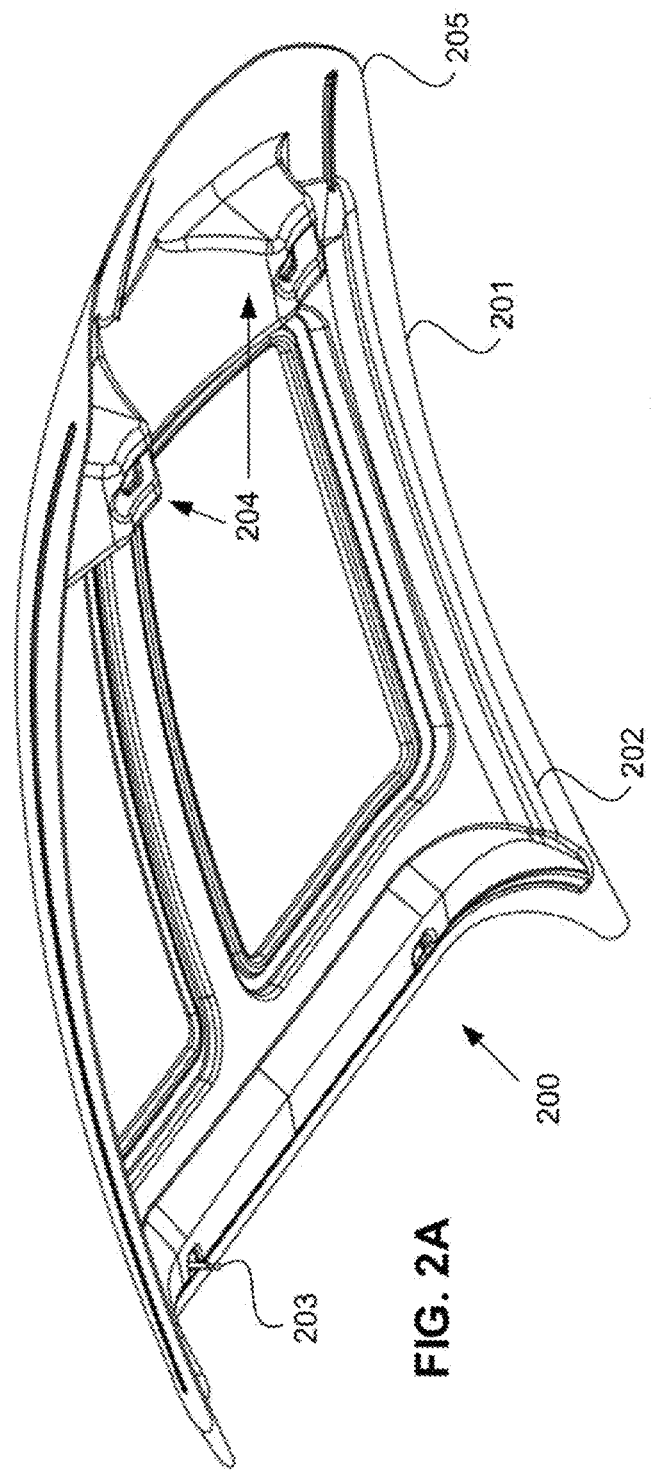
FIGS. 2A-C depict views of a floating, removable vehicle roof.
Figure 2B:
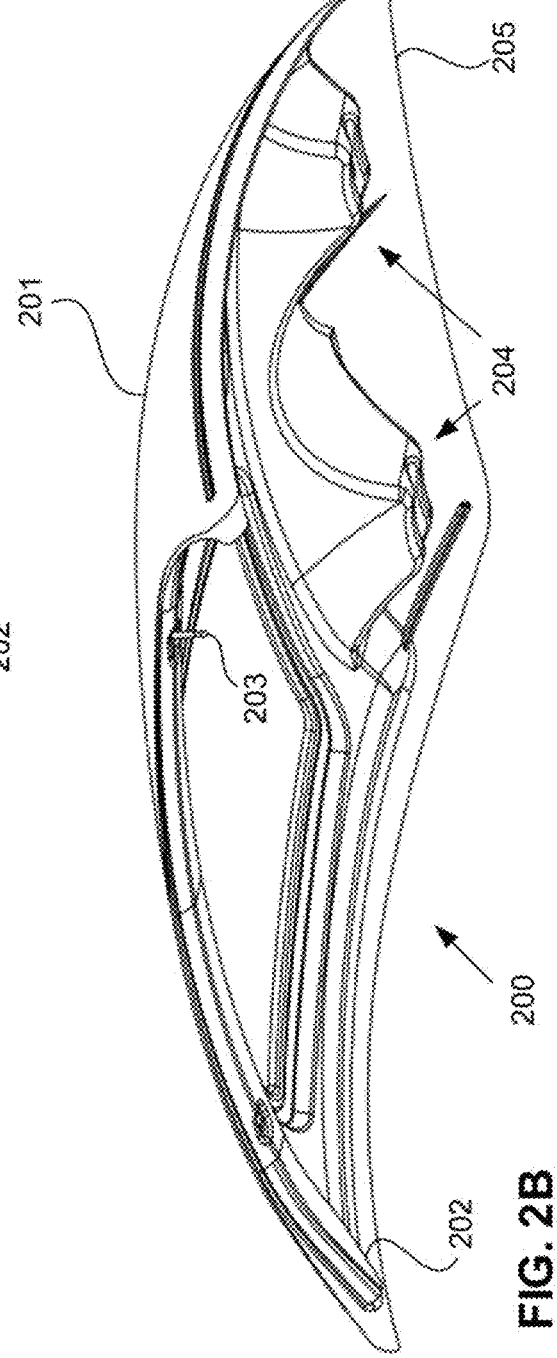
Figure 2C:
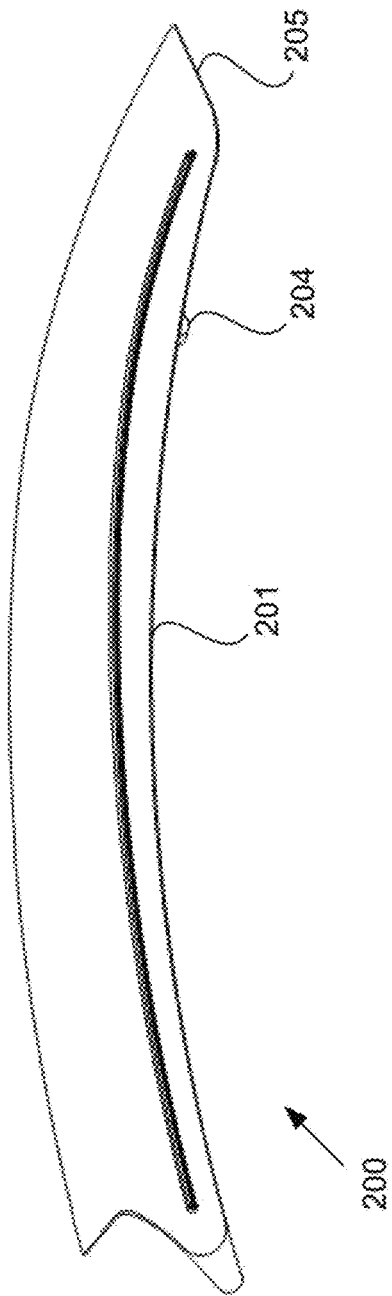

FIGS. 2A-C depict views of a floating, removable vehicle roof. Roof 200 includes shell 201, frame 202, windshield mount 203, roll bar mounts 204, and overhang 205.

Figure 3:
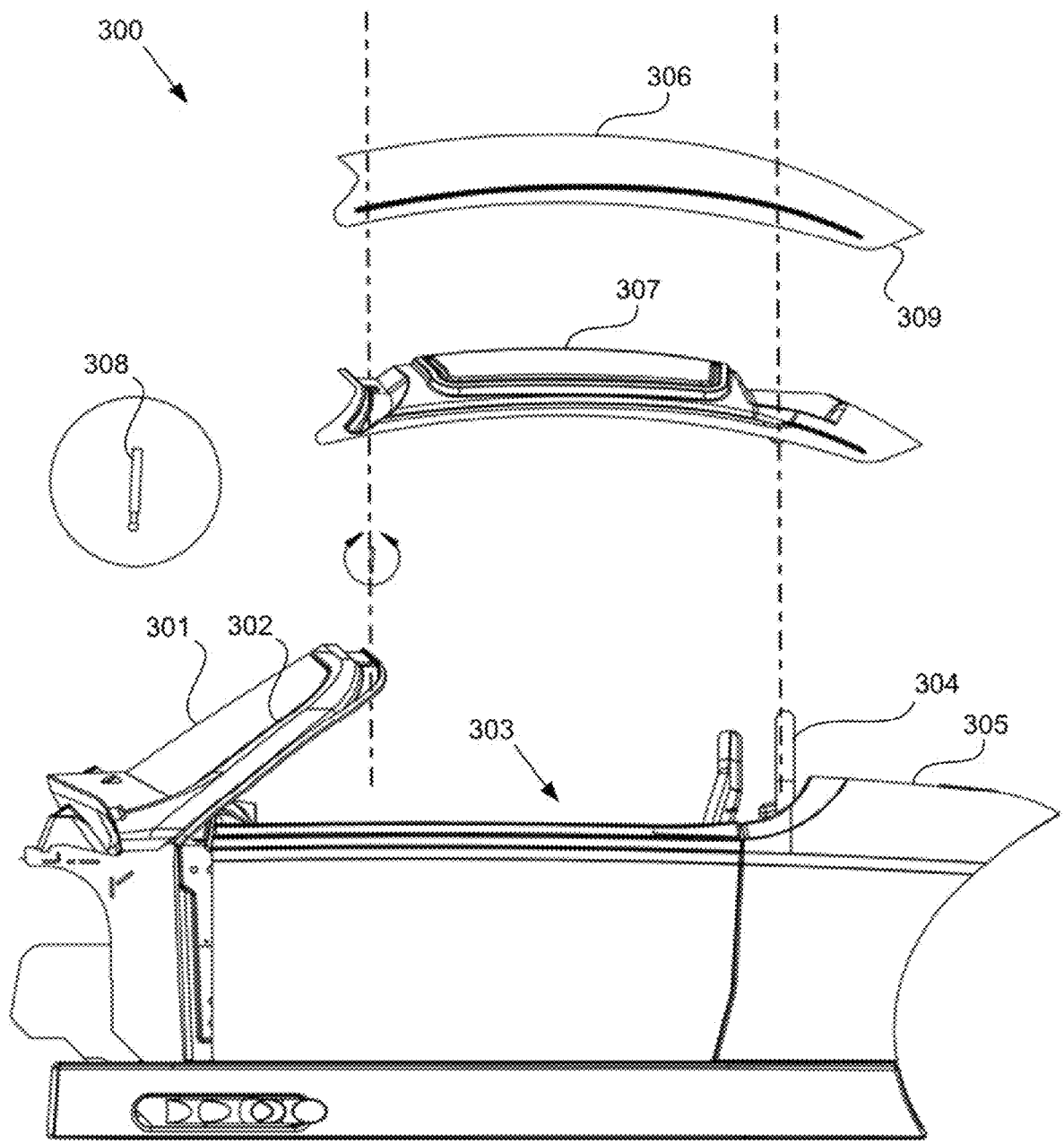
FIG. 3 depicts a partial exploded view of a vehicle including a floating, removable roof.

FIG. 3 depicts a partial exploded view of a vehicle including a floating, removable roof. Vehicle 300 includes windshield 301, windshield frame 302, passenger compartment 303, roll bars 304, aft body panel 305, roof shell 306, roof frame 307, windshield mount 308, and overhang 309.

Figure 4:
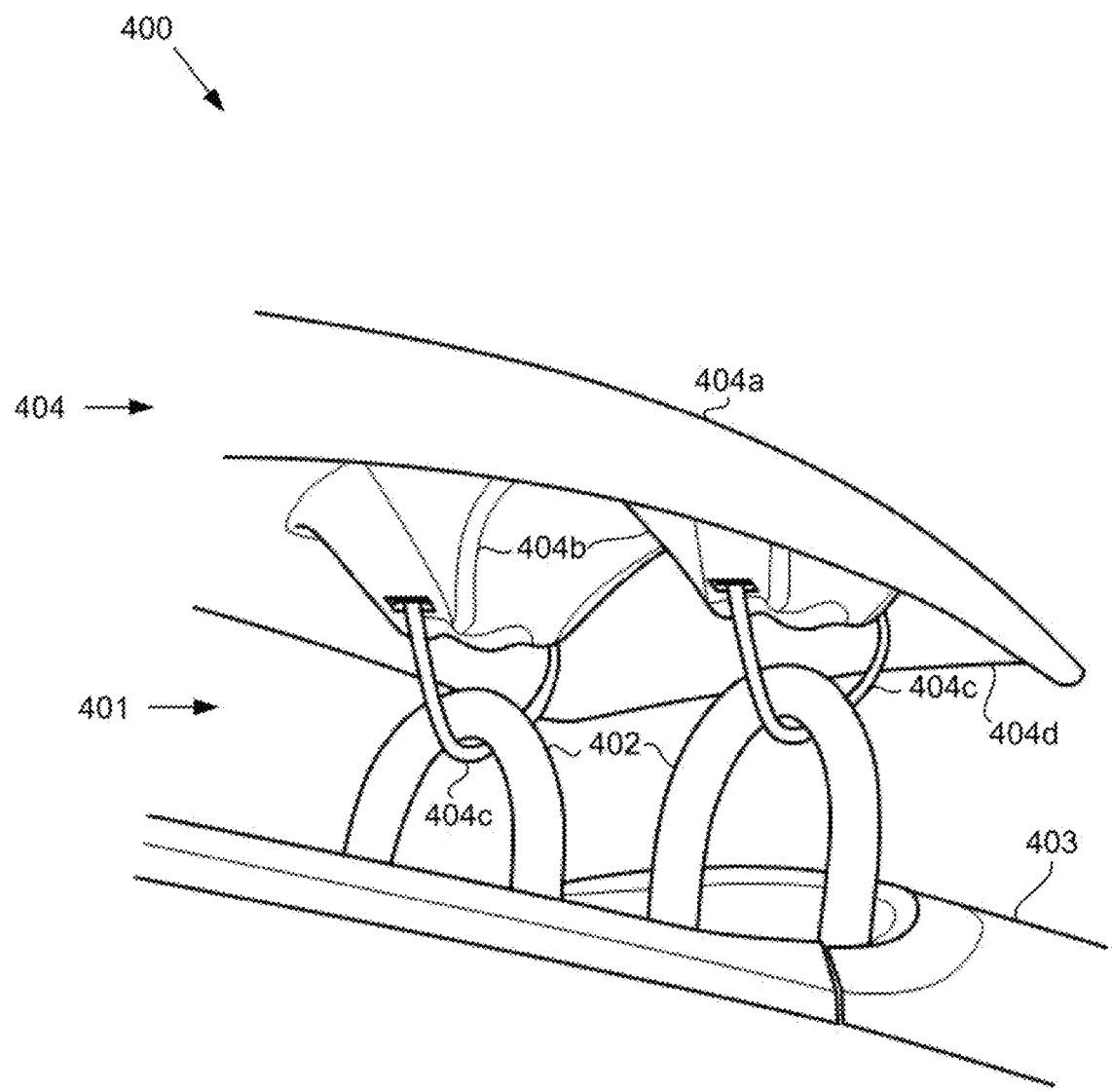
FIG. 4 depicts an isometric view of one embodiment of roof roll bar mounts.

FIG. 4 depicts an isometric view of one embodiment of roof roll bar mounts.

Vehicle 400 includes passenger compartment 401, roll bars 402, aft body panel 403, and roof 404. The roof includes shell 404*a*, roll bar mounts 404*b*, straps 404*c*, and overhang 404*d*. The shell is rigid, and thus the roof excludes a separate from. The roof is also monolithic, including the shell and the roll bar mounts. The roll bar mounts, as shown, are spaced from the roll bars to conveniently show how the straps wrap around the roll bars. As shown, the straps insert into the roll bar mounts. The straps may be tightened and secure the roof to the roll bars.

Figure 5A:
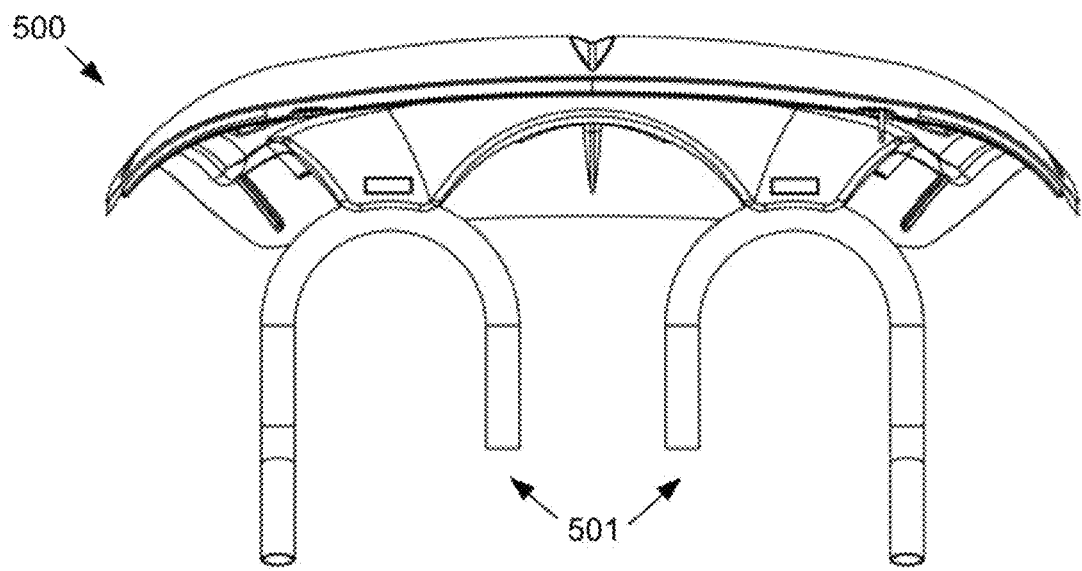
FIGS. 5A-B show two views of a floating, removable roof resting on two roll bars.
Figure 5B:
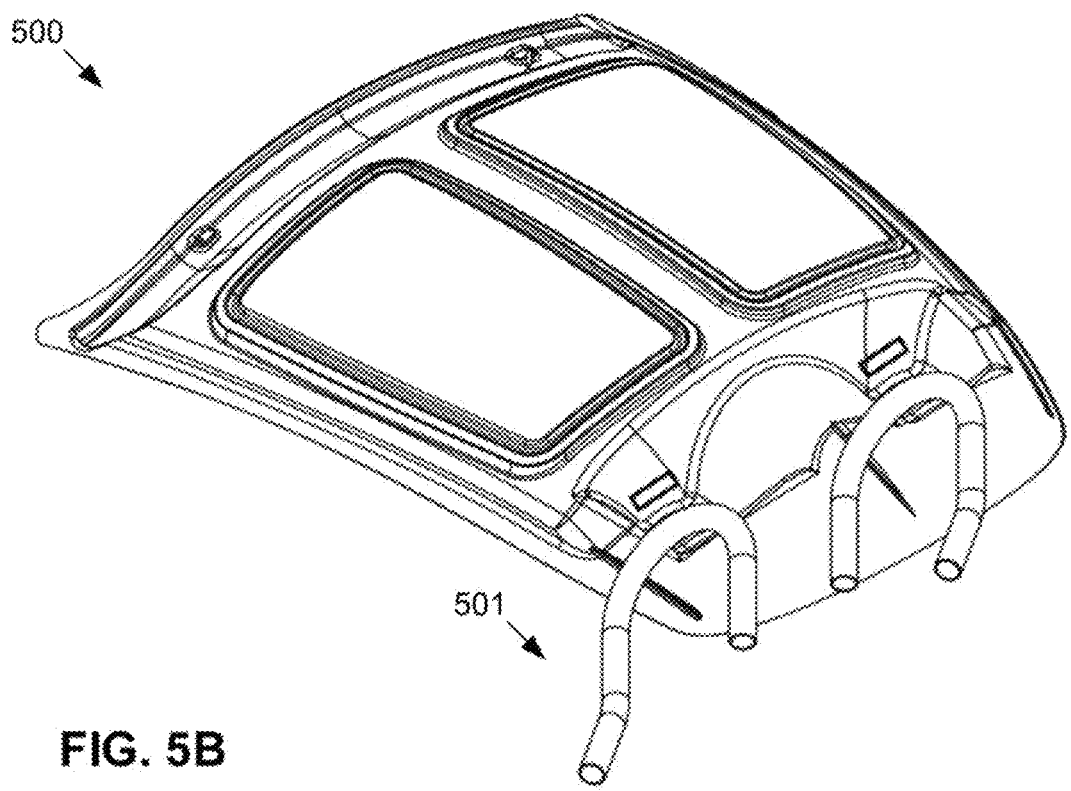

FIGS. 5A-B show two views of a floating, removable roof resting on two roll bars. As shown, roof 500 rests on roll bars 501.

Figure 6A:
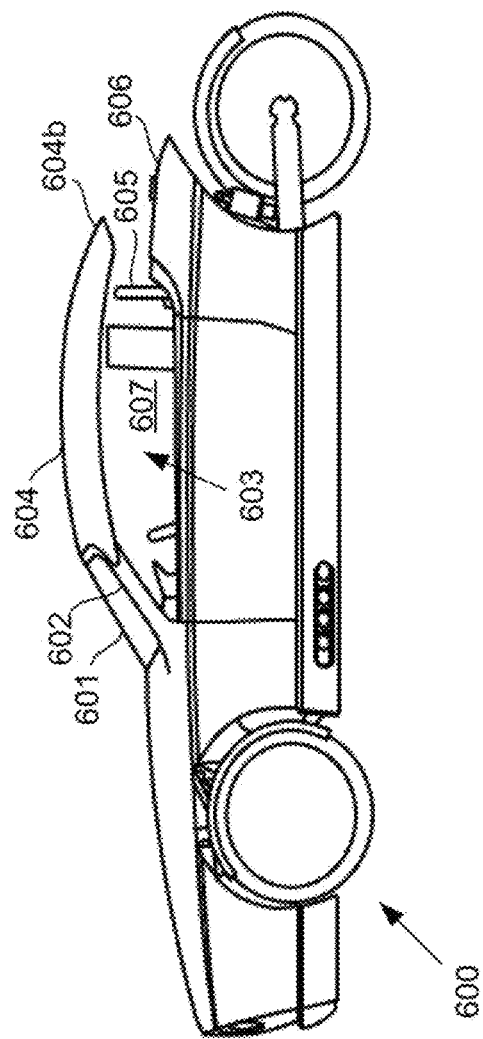
FIGS. 6A-B show full and partial views of a vehicle including a floating, removable roof.
Figure 6B:
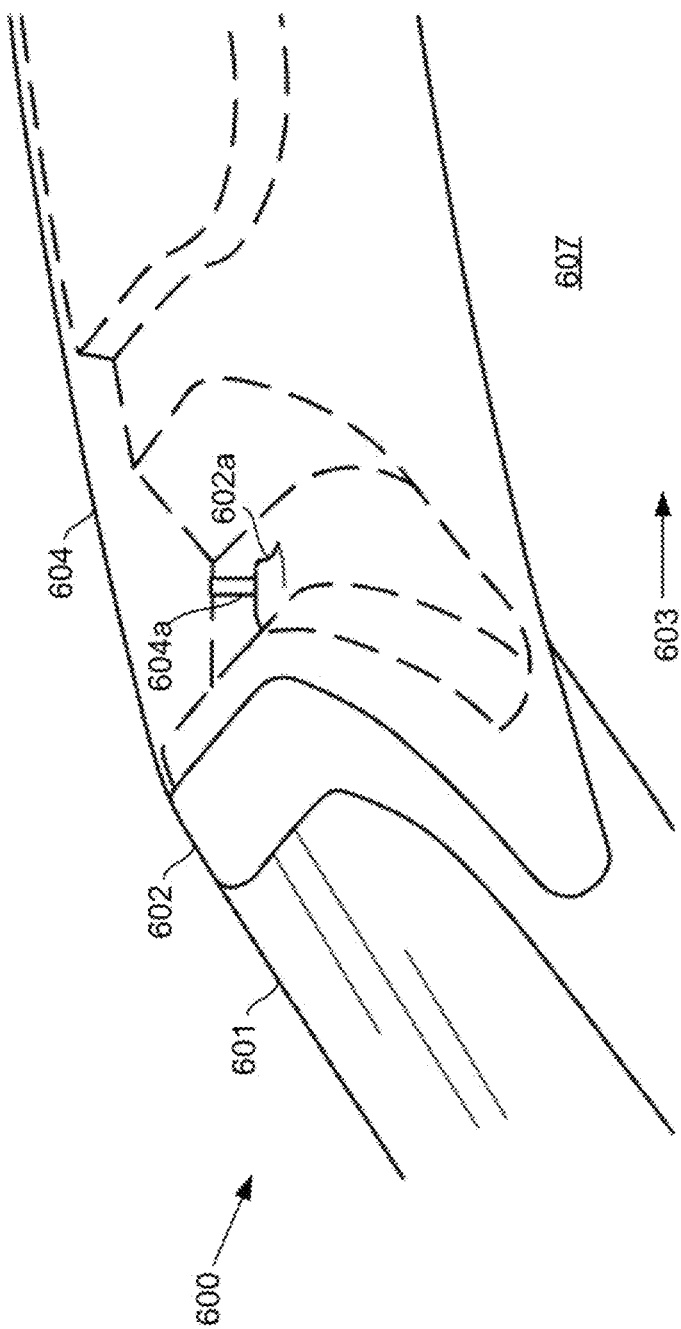

FIGS. 6A-B show full and partial views of a vehicle including a floating, removable roof. Vehicle 600 includes windshield 601, windshield frame 602, rubberized opening 602*a*, passenger compartment 603, floating removable roof 604, windshield mount 604*a*, overhang 604*b*, roll bars 605, aft body panel 606, and void 607. As shown, the void is continuous, and extends around and over the passenger compartment, between the roof and the roll bars, and between the roof and the aft body panel. The depicted embodiment excludes roll bar mounts, such that the overhang extends from the windshield and over the passenger compartment and the aft body panel.

Figure 7:
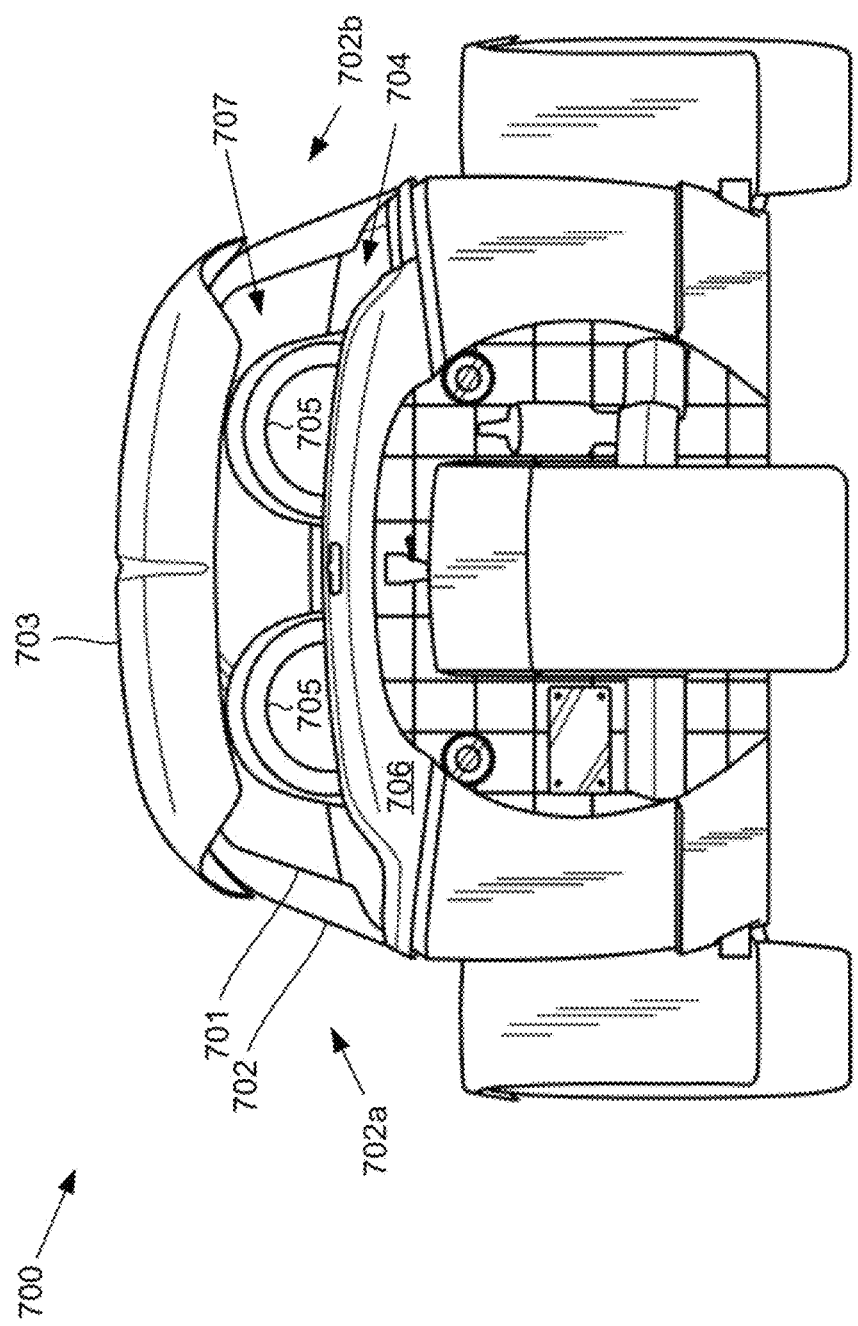
FIG. 7 depicts a rear view of a vehicle having a floating, removable roof.

FIG. 7 depicts a rear view of a vehicle having a floating, removable roof. Vehicle 700 includes windshield 701, windshield frame 702, left side 702*a*, right side 702*b*, roof 703, passenger compartment 704, roll bars 705, aft body panel 706, and void 707. Similar to the embodiment depicted in FIG. 6A, the void is continuous, extending from the left side to the right side, over the passenger compartment, over the aft body panel, and between the roof and the roll bars.

Figure 8:
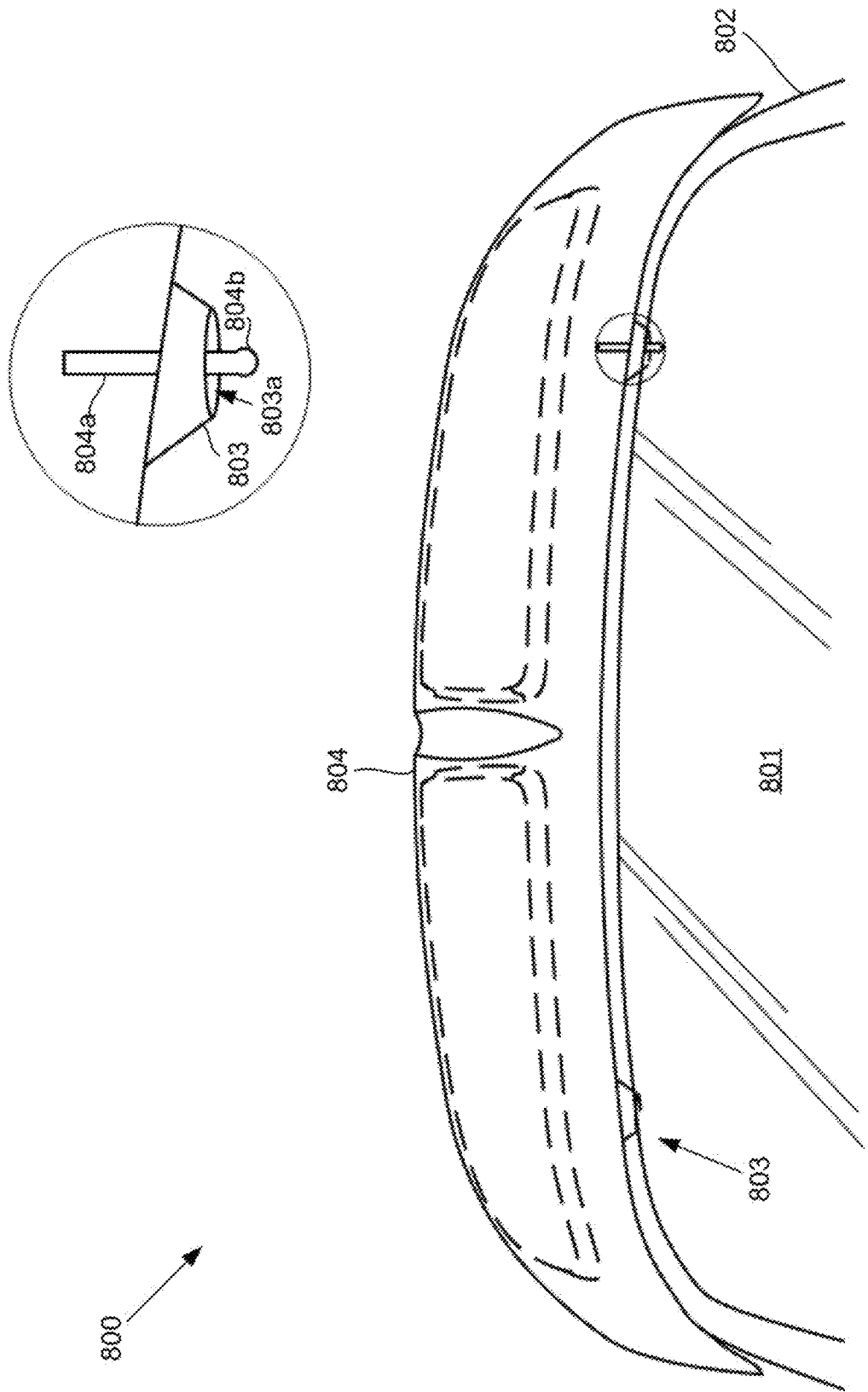
FIG. 8 depicts a partial view of a vehicle having a floating, removable roof.

FIG. 8 depicts a partial view of a vehicle having a floating, removable roof. Vehicle 800 includes windshield 801, windshield frame 802, rubberized openings 803, conical opening 803*a*, floating removable roof 804, windshield mount 804*a*, and spherical tip 804*b*. The conical opening that narrows in diameter to less than the diameter of the spherical tip. In some embodiments, the rubberized opening has a diameter less than the diameter of the windshield mount, and the roof is held in place by the static friction between the rubberized opening and the windshield mount.

Figure 9:
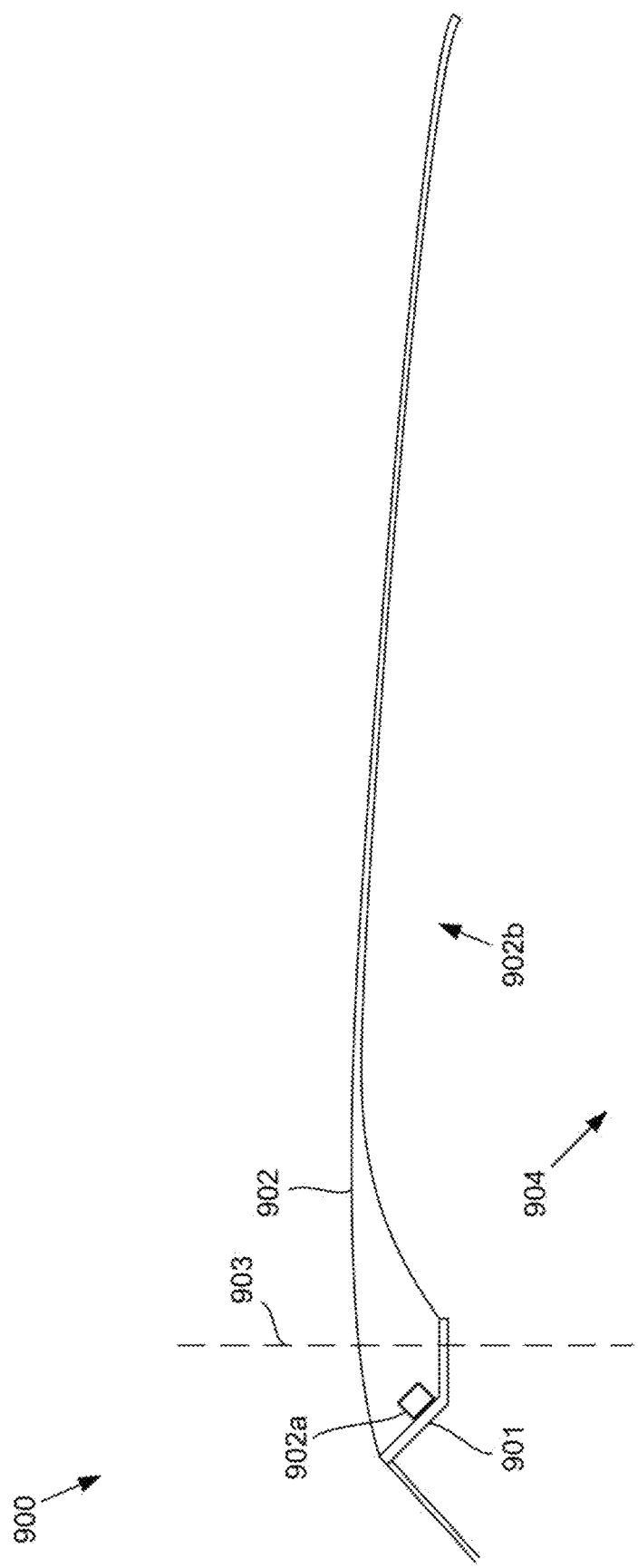
FIG. 9 depicts a partial section view of a vehicle having a floating, removable cover.

FIG. 9 depicts a partial section view of a vehicle having a floating, removable cover. Vehicle 900 includes body structure 901, floating removable cover 902, magnet 902a, overhang 902b, center of gravity 903, and compartment 904. The body structure is ferromagnetic, and the cover is magnetically secured to the body structure by the magnet, and has a center of gravity at point 903 over the body structure. The cover is rigid, and freely overhangs the compartment.

FIGS. 10A-B depict partial section views of a vehicle including a floating, removable cover supported on support structures by support structure mounts. Vehicle 1000 includes passenger compartment 1001, support structures 1002, cover 1003, support structure mounts 1003a, and arcs 1003b. Some embodiments include conical vias 1003c that pass through the support structure mounts and facilitate airflow through the passenger compartment. The support structure mounts are monolithic with the cover and each other, and rest on the support structures.

Figure 11B:
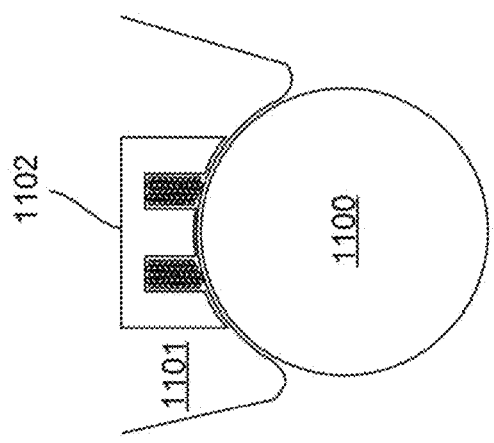
FIGS. 11A-E depict various securing mechanisms for securing a support structure mount to a support structure.
Figure 11A:
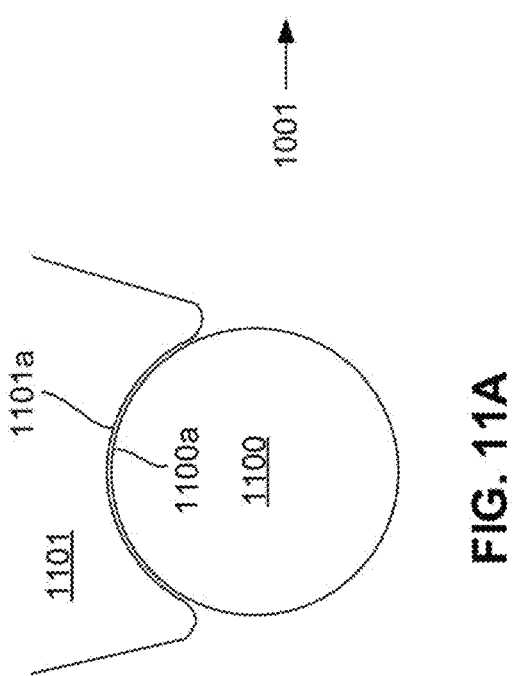
Figure 11C:
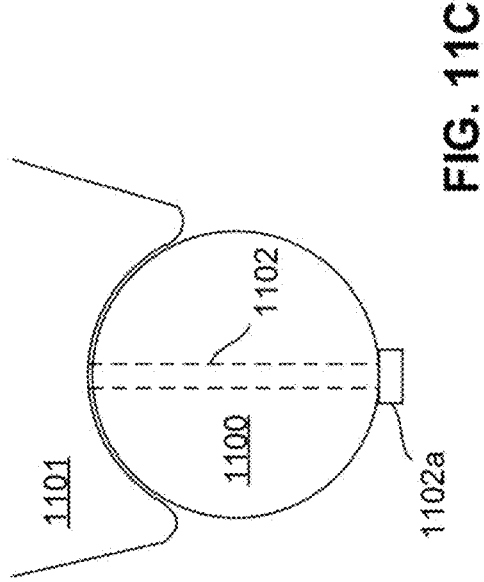
Figure 11D:
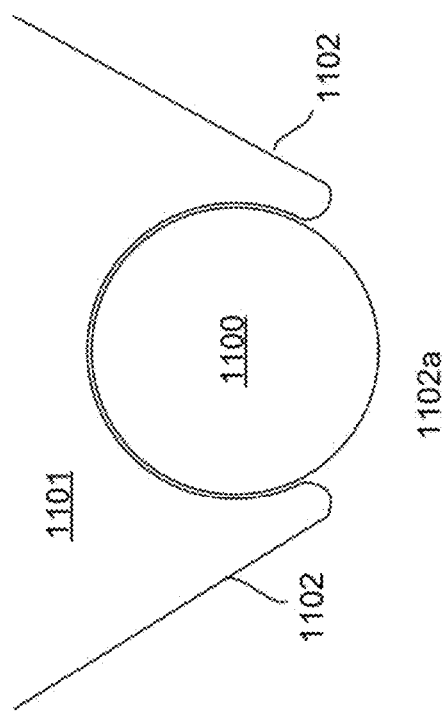
Figure 11E:
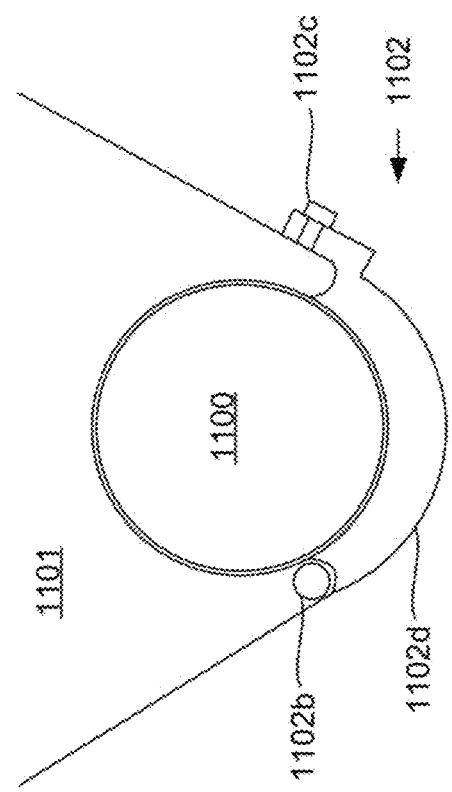

FIGS. 11A-E depict various securing mechanisms for securing a support structure mount to a support structure. Generally, each view includes support structure 1100, support structure surface 1100a, support structure mount 1101, and support structure mount surface 1101a. FIGS. 11B-E also each depict securing mechanisms 1102. As shown in FIG. 11A, the support structure mount surface is complementary to, and mates with, the support structure surface. FIG. 11B depicts the securing mechanism as an electromagnet, where the support structure is ferromagnetic. FIG. 11C depicts the securing mechanism as a rod passing through the support structure and secured by nut 1102a. The support structure includes an opening through which the securing mechanism passes. In some embodiments, the opening is rubberized, and has an unstretched diameter less than a diameter of the rod. The frictional force between the opening and the rod as the rod stretches the diameter of the opening secures the support structure mount to the support structure. FIG. 11D depicts the securing mechanism as an arc having an angle greater than one hundred and eighty degrees. As the securing mechanism is forced over the support structure, the securing mechanism flexes outwards. Past the diameter of the support structure, the securing mechanism returns to its unflexed chord length and holds the support structure mount to the support structure. FIG. 11E depicts the securing mechanism as a clasp, including hinge 1102b, latch 1102c, and explementary arc 1102d.

We claim:

1. A vehicle, comprising:
   a windshield;
   a passenger compartment;
   one or more body panels around the passenger compartment; and
   a removable and at least partially floating roof extending as an overhang from a support structure disposed over the passenger compartment, the roof comprising:
   one or more windshield mounts; and
   an overhang extending from the windshield over and across the passenger compartment.

2. The vehicle of claim 1, at least one body panel disposed aft of the passenger compartment and aligned parallel to the roof, wherein the overhang extends past the passenger compartment and over the aft body panel.

3. The vehicle of claim 2, further comprising a void disposed between the roof and the one or more body panels, the void extending around the passenger compartment from a first side of the windshield to a second side of the windshield and beneath the floating overhang.

4. The vehicle of claim 1, wherein the floating roof is monolithic, rigid, or both.

5. The vehicle of claim 1, the floating roof having a center of mass biased towards the windshield.

6. The vehicle of claim 1, wherein at least one of the windshield mounts is aligned with the center of mass of the floating roof.

7. The vehicle of claim 1, the floating roof further comprising a rigid frame coupled to the windshield by the one or more windshield mounts and a shell wrapped over the rigid frame, the shell and the frame forming the overhang.

8. The vehicle of claim 1, further comprising one or more roll bars, the floating roof further comprising one or more roll bar mounts extending beneath the floating roof and mounting the floating roof to the roll bars.

9. The vehicle of claim 8, the one or more rigid roll bar mounts comprising one or more straps wrapped at least partially around the one or more roll bars, thereby affixing the one or more rigid roll bar mounts to the one or more roll bars.

10. The vehicle of claim 8, at least one of the one or more rigid roll bar mounts having a surface shape complementary to a corresponding surface shape of at least one of the one or more roll bars.

11. The vehicle of claim 10, wherein the corresponding surface shape of the at least one of the one or more roll bars is circular, and wherein the complementary rigid roll bar mount surface shape comprises an arc that mates with the at least one roll bar.

12. The vehicle of claim 11, wherein the arc angle is greater than one hundred and eighty degrees and corresponds with a flexural strength of a material forming the at least one rigid roll bar mount.

13. The vehicle of claim 11, further comprising a rigid clasp coupled to the at least one rigid roll bar mount and wrapped around the at least one roll bar, the clasp forming an arc explementary to the rigid roll bar mount surface shape arc.

14. The vehicle of claim 8, at least one of the one or more rigid roll bar mounts comprising an end portion extending at least partially into at least one of the one or more roll bars.

15. The vehicle of claim 14, further comprising a securing mechanism, wherein the end portion extends through the at least one roll bar, and wherein the securing mechanism prevents the end portion from retracting through the at least one roll bar.

16. The vehicle of claim 8, at least one of the one or more rigid roll bar mounts magnetically affixed to at least one of the one or more roll bars.

17. The vehicle of claim 8, wherein the one or more rigid roll bar mounts and the overhang form an arc.

18. The vehicle of claim 17, comprising at least two rigid roll bar mounts, the arc disposed between the at least two rigid roll bar mounts.

19. The vehicle of claim 1, further comprising a windshield frame, wherein the windshield is mounted to the vehicle in the windshield frame, and wherein the roof windshield mounts include one or more rods that extend into one or more corresponding openings in the windshield frame.

20. The vehicle of claim 1, wherein the windshield and roof are aerodynamically continuous.

* * * * *